W. T. WHALEY.
LOCK NUT.
APPLICATION FILED NOV. 29, 1913. RENEWED APR. 14, 1917.

1,235,864.

Patented Aug. 7, 1917.

Witnesses
Hugh H. Ott

Inventor
William T. Whaley
By Victor J. Evans
Attorney

UNITED STATES PATENT OFFICE.

WILLIAM T. WHALEY, OF LOS ANGELES, CALIFORNIA.

LOCK-NUT.

1,235,864. Specification of Letters Patent. Patented Aug. 7, 1917.

Application filed November 29, 1913, Serial No. 803,770. Renewed April 14, 1917. Serial No. 162,189.

*To all whom it may concern:*

Be it known that I, WILLIAM T. WHALEY, a citizen of the United States, residing at Los Angeles, in the county of Los Angeles and State of California, have invented new and useful Improvements in Lock-Nuts, of which the following is a specification.

The present invention relates to improvements in means for normally sustaining a nut and bolt in locked position, and resides in the construction, combination and arrangement of parts set forth in the following specification and falling within the scope of the appended claim.

Figure 1:
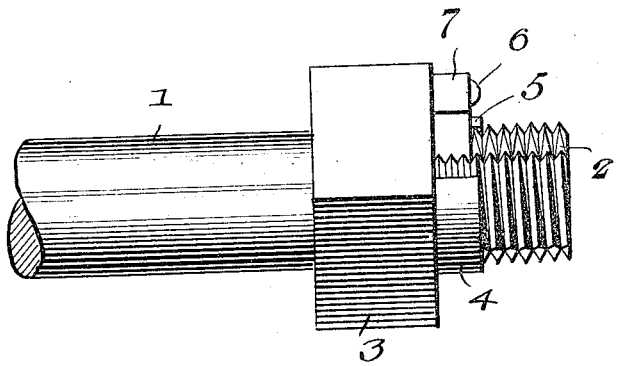
Figure 1 is a view illustrating a nut in locked position on a bolt.
Figure 2:
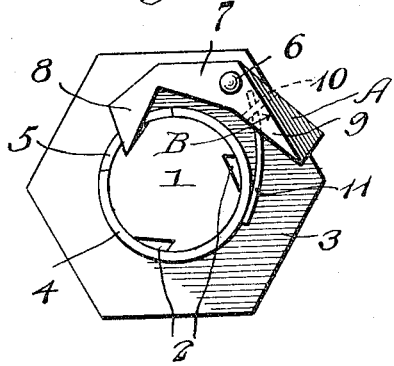
Fig. 2 is an enlarged front elevation of the same.
Figure 3:
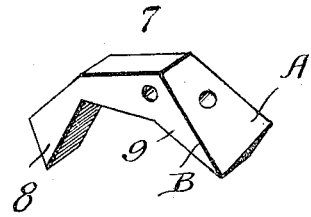
Fig. 3 is a detail perspective view of the locking pawl.

Referring now to the drawings in detail, the numeral 1 designates a bolt which has its shank formed with a plurality of spaced longitudinally extending depressions or channels 2, the said channels each providing a wide straight wall and an angular shoulder.

The nut is designated by the numeral 3, and its threaded bore is adapted to co-act with the threads of the bolt. The outer face of the nut has its bore surrounded by an integrally formed annular flange or sleeve 4, the said flange being formed with a slot or opening 5.

Pivotally connected, as at 6, to the said outer face of the nut is a locking dog 7. The dog is formed with an angular tooth 8 which enters the slot 5 of the flange 4, and is provided with an angular tail 9 which extends from its pivot in a direction opposite to the end which is formed with the tooth 8. Secured upon the inner face of the tail 9 of the dog 7, through the medium of a pin 10, is a flat curved spring 11 which exerts a tension between the tail of the dog and the rounded periphery of the flange 4. The tail 9 of the dog is preferably inclined from the outer to the inner face thereof, the said inclination starting at the juncture of the tail with the dog proper and being arranged angularly to the pointed end of the tail upon the outer face thereof, so that a beveled surface A is arranged upon the above-mentioned inclined edge B, the said beveled portion projecting beyond one of the faces of the nut. This beveled portion A readily permits of an instrument, such as a socket nut, being arranged upon the nut to actuate the dog to swing the same to an unlocking position, while at the same time it does not interfere with the arrangement of an ordinary monkey wrench upon the dog.

From the above description, taken in connection with the drawing, it will be apparent that the nut 3 may be screwed entirely home upon the bolt 1, the dog swinging upon its pivot against the action of its spring 11 and passing into the depressions or channels 2 and riding over the threads of the bolts, but a retrograde movement of the nut will cause the angular tooth to engage with an angular shoulder of the channel 2 to prevent the unscrewing of the nut and bolt.

When it is desired to remove the nut from the bolt, the jaws of the wrench will be brought to contact with the outer edge of the tail 9 of the dog 7, which movement will cause the dog to swing upon its pivot to bring its tooth out of engagement with the channels 2 of the bolt 1.

Having thus described the invention, what I claim is:

In combination, a bolt provided with a plurality of longitudinally extending channels, a nut threaded thereon, an annular flange formed integral with one side of the nut, encircling portions of said channels and contacting with the threads of the bolt adjacent the nut, said flange being formed with a slot, a locking dog pivoted to the side of the nut and having its bill passing through the slot so as to engage one of said channels, and a leaf spring having one extremity bearing on the outer surface of said flange and its remaining extremity secured to said dog.

In testimony whereof I affix my signature in presence of two witnesses.

WILLIAM T. WHALEY.

Witnesses:
JOHN A. FRASER,
THOMAS KELLY.

Copies of this patent may be obtained for five cents each, by addressing the "Commissioner of Patents, Washington, D. C."